(12) United States Patent
Zhang et al.

(10) Patent No.: US 11,373,153 B2
(45) Date of Patent: *Jun. 28, 2022

(54) SYSTEMS AND METHODS FOR OBJECT PROCESSING

(71) Applicant: TENCENT TECHNOLOGY (SHENZHEN) COMPANY LIMITED, Shenzhen (CN)

(72) Inventors: Xiaolong Zhang, Shenzhen (CN); Wa Ye, Shenzhen (CN); Peng Liu, Shenzhen (CN); Shushen Lu, Shenzhen (CN); Xing Liang, Shenzhen (CN); Ming Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 826 days.

This patent is subject to a terminal disclaimer.

(21) Appl. No.: 16/239,877

(22) Filed: Jan. 4, 2019

(65) Prior Publication Data
US 2019/0156306 A1    May 23, 2019

Related U.S. Application Data

(63) Continuation of application No. 14/291,177, filed on May 30, 2014, now Pat. No. 10,210,491, which is a (Continued)

(30) Foreign Application Priority Data
Apr. 28, 2013   (CN) .......................... 201310156430.8

(51) Int. Cl.
G06Q 20/08      (2012.01)
H04L 51/04      (2022.01)
(Continued)

(52) U.S. Cl.
CPC ....... *G06Q 20/0855* (2013.01); *G06Q 20/027* (2013.01); *G06Q 20/12* (2013.01);
(Continued)

(58) Field of Classification Search
None
See application file for complete search history.

(56) References Cited

U.S. PATENT DOCUMENTS

2007/0255653 A1   11/2007   Tumminaro et al.
2009/0012900 A1*   1/2009   Morin .............. G06Q 20/4093
                                                              705/64
(Continued)

FOREIGN PATENT DOCUMENTS

CN        1968103 A      5/2007
CN     101079132 A      11/2007
(Continued)

OTHER PUBLICATIONS

"Terminal" Definition, PCMag Encyclopedia, https://www.pcmag.com/encyclopedia/term/terminal (Year: 2021).*
(Continued)

*Primary Examiner* — Steven S Kim
*Assistant Examiner* — Jason B Fenstermacher
(74) *Attorney, Agent, or Firm* — Anova Law Group, PLLC

(57) ABSTRACT

Systems and methods are provided for processing objects. For example, a call request message is received, the call request message carrying an identification (ID) of order data associated with one or more objects, the order data including at least a total value of the objects and an ID of a second subject; a first account related to a first subject and a user password related to the first subject are acquired; the first account and the user password and the ID of the order data are sent; the first account and the user password and the ID
(Continued)

of the order data are forwarded; and based on at least information associated with the first account and the user password and the ID of the order data, the total value is deducted from a first value included in the first account related to the first subject.

20 Claims, 11 Drawing Sheets

Related U.S. Application Data continuation of application No. PCT/CN2013/085559, filed on Oct. 21, 2013.

(51) Int. Cl.

| | |
|---|---|
| G06Q 20/02 | (2012.01) |
| G06Q 20/12 | (2012.01) |
| G06Q 20/32 | (2012.01) |
| G06Q 20/38 | (2012.01) |
| G06Q 20/40 | (2012.01) |
| G06Q 20/42 | (2012.01) |

(52) U.S. Cl.
CPC ..... *G06Q 20/322* (2013.01); *G06Q 20/38215* (2013.01); *G06Q 20/4012* (2013.01); *G06Q 20/425* (2013.01); *H04L 51/04* (2013.01)

(56) References Cited

U.S. PATENT DOCUMENTS

| | | | | |
|---|---|---|---|---|
| 2012/0215658 | A1* | 8/2012 | Estrada | ............. G06Q 20/3226 |
| | | | | 705/26.41 |
| 2013/0013499 | A1* | 1/2013 | Kalgi | ................ G06Q 20/3674 |
| | | | | 705/41 |
| 2013/0074167 | A1* | 3/2013 | Bailey | .................... G06F 21/41 |
| | | | | 726/8 |
| 2013/0346302 | A1 | 12/2013 | Purves et al. | |
| 2014/0052638 | A1* | 2/2014 | Chung | ................. G06Q 20/425 |
| | | | | 705/44 |

FOREIGN PATENT DOCUMENTS

| | | |
|---|---|---|
| CN | 101211439 A | 7/2008 |
| CN | 101527070 A | 9/2009 |
| CN | 101604427 A | 12/2009 |
| CN | 101632095 A | 1/2010 |
| CN | 101647036 A | 2/2010 |
| CN | 102938120 A | 2/2013 |
| JP | 2003078952 A | 3/2003 |
| JP | 2003256742 A | 9/2003 |
| JP | 2007521542 A | 8/2007 |
| JP | 2009218633 A | 9/2009 |
| JP | 2011503711 A | 1/2011 |
| WO | 2012170484 A1 | 12/2012 |

OTHER PUBLICATIONS

Japanese Patent Office, Office Action dated Jul. 5, 2016, in Application No. 2016-509267.
Korea Patent Office, Notice of Preliminary Rejection dated Dec. 4, 2015, in Application No. 10-2015-7033110.
Patent Cooperation Treaty, Written Opinion of the International Searching Authority, PCT/CN2013/085559, dated Feb. 20, 2014.
Patent Cooperation Treaty, International Preliminary Report on Patentability, PCT/CN2013/085559, dated Nov. 3, 2015.
Chinese Patent Office, Office Action dated Sep. 2, 2015, in Application No. 201410175891 4.
Chinese Patent Office, Office Action dated Apr. 27, 2015, in Application No. 201410175891.4.
Patent Cooperation Treaty, International Search Report, PCT/CN2013/085559, dated Feb. 20, 2014.

* cited by examiner

500

```
┌─────────────────────────────────────┐
│  ┌──────┐ Input Interface for       │
│  │Return│ Identificaiton-           │
│  └──────┘ Validation Information    │
├─────────────────────────────────────┤
│                                     │
│   ┌─────────────────────────────┐   │
│   │ Account Type : Account Type 1│  │
│   └─────────────────────────────┘   │
│                                     │
│       Please enter identification   │
│       information for validation    │
│   ┌─────────────────────────────┐   │
│   │ Name:                       │   │
│   ├─────────────────────────────┤   │
│   │ ID Card No.:                │   │
│   └─────────────────────────────┘   │
│                                     │
│   ┌─────────────────────────────┐   │
│   │ Cell Phone No.:             │   │
│   └─────────────────────────────┘   │
│                                     │
│   ☑ IM Support Protocol             │
│                                     │
│         ┌─────────────┐             │
│         │    Next     │             │
│         └─────────────┘             │
└─────────────────────────────────────┘
```

— First Input Box
— Second Input Box
— Third Input Box

Figure 5

SYSTEMS AND METHODS FOR OBJECT PROCESSING

CROSS-REFERENCES TO RELATED APPLICATIONS

This application is a continuation application of U.S. patent application Ser. No. 14/291,177, filed on May 30, 2014. U.S. patent application Ser. No. 14/291,177 is a continuation application of PCT Patent Application No. PCT/CN2013/085559, filed on Oct. 21, 2013, which claims priority to Chinese Patent Application No. 201310156430.8, filed Apr. 28, 2013, the entire content of all above applications are incorporated by reference herein for all purposes.

BACKGROUND OF THE INVENTION

Certain embodiments of the present invention are directed to computer technology. More particularly, some embodiments of the invention provide systems and methods for network technology. Merely by way of example, some embodiments of the invention have been applied to data processing. But it would be recognized that the invention has a much broader range of applicability.

With the rapid development of Internet technology, online shopping has become increasingly popular. Currently, users can log onto an E-commerce website using a cell phone for shopping and then process purchased goods to pay a certain amount of money for the purchased goods to a merchant.

Often, a user downloads and installs a shopping client from the E-commerce website. In addition, the user downloads and installs a payment client from a third-party system. The user logs onto the E-commerce website via the shopping client and choose goods to purchase. The E-commerce website generates an order which includes at least the amount of money for the purchased goods and an ID of the merchant and sends the order to the user. The user then logs onto the third-party system and sends the order number and a user account to the third-party system via the payment client. The third-party website pays to the merchant the amount of money for the purchased goods according to the order number and the user account, hence completing the processing of the purchased goods.

But the above-noted conventional approach often has certain problems. For example, the user usually needs to log onto the third-party system for processing the purchased goods, which often results in low efficiency.

Hence it is highly desirable to improve the techniques for processing objects.

BRIEF SUMMARY OF THE INVENTION

According to one embodiment, a method is provided for processing objects. For example, a call request message is received, the call request message carrying an identification (ID) of order data associated with one or more objects, the order data including at least a total value of the objects and an ID of a second subject; a first account related to a first subject and a user password related to the first subject are acquired; the first account related to the first subject, the user password related to the first subject and the ID of the order data are sent; the first account related to the first subject, the user password related to the first subject and the ID of the order data are forwarded; and based on at least information associated with the first account related to the first subject, the user password related to the first subject and the ID of the order data, the total value is deducted from a first value included in the first account related to the first subject; and the total value is added to a second value included in a first account related to the second subject.

According to another embodiment, a system for processing objects includes an instant messenger (IM) terminal, an IM server, and a third-party system. The IM terminal is configured to receive a call request message from an object terminal, the call request message carrying an identification (ID) of order data associated with one or more objects, the order data including at least a total value of the objects and an ID of a second subject. The IM terminal is further configured to acquire a first account related to a first subject and a user password related to the first subject. The IM server is configured to receive the first account related to the first subject, the user password related to the first subject and the ID of the order data, the IM terminal being logged onto the IM server. The third-party system is configured to receive the first account related to the first subject, the user password related to the first subject and the ID of the order data via a communication interface between the IM server and the third-party system. The third-party system is further configured to deduct the total value from a first value included in the first account related to the first subject and add the total value to a second value included in a first account related to the second subject based on at least information associated with the first account related to the first subject, the user password related to the first subject and the ID of the order data.

According to yet another embodiment, a system for processing objects includes one or more data processors and a computer-readable storage medium. The computer-readable storage medium is encoded with instructions for commanding the data processors to execute the following operations: receiving a call request message, the call request message carrying an identification (ID) of order data associated with one or more objects, the order data including at least a total value of the objects and an ID of a second subject, acquiring a first account related to a first subject and a user password related to the first subject, sending the first account related to the first subject, the user password related to the first subject and the ID of the order data, forwarding the first account related to the first subject, the user password related to the first subject and the ID of the order data, and based on at least information associated with the first account related to the first subject, the user password related to the first subject and the ID of the order data, deducting the total value from a first value included in the first account related to the first subject and adding the total value to a second value included in a first account related to the second subject.

According to yet another embodiment, a non-transitory computer readable storage medium comprises programming instructions for processing objects. The programming instructions are configured to cause one or more data processors to execute the following operations including: receiving a call request message, the call request message carrying an identification (ID) of order data associated with one or more objects, the order data including at least a total value of the objects and an ID of a second subject, acquiring a first account related to a first subject and a user password related to the first subject, sending the first account related to the first subject, the user password related to the first subject and the ID of the order data, forwarding the first account related to the first subject, the user password related to the first subject and the ID of the order data, and based on at least information associated with the first account related to the first subject, the user password related to the first subject and the ID of the order data, deducting the total value from a first value included in the first account related to the first subject and adding the total value to a second value included in a first account related to the second subject.

Depending upon embodiment, one or more benefits may be achieved. These benefits and various additional objects, features and advantages of the present invention can be fully appreciated with reference to the detailed description and accompanying drawings that follow.

BRIEF DESCRIPTION OF THE DRAWINGS

FIG. 5 is a simplified diagram showing an interface for inputting identification-validation information according to one embodiment of the present invention;

DETAILED DESCRIPTION OF THE INVENTION

Figure 1:
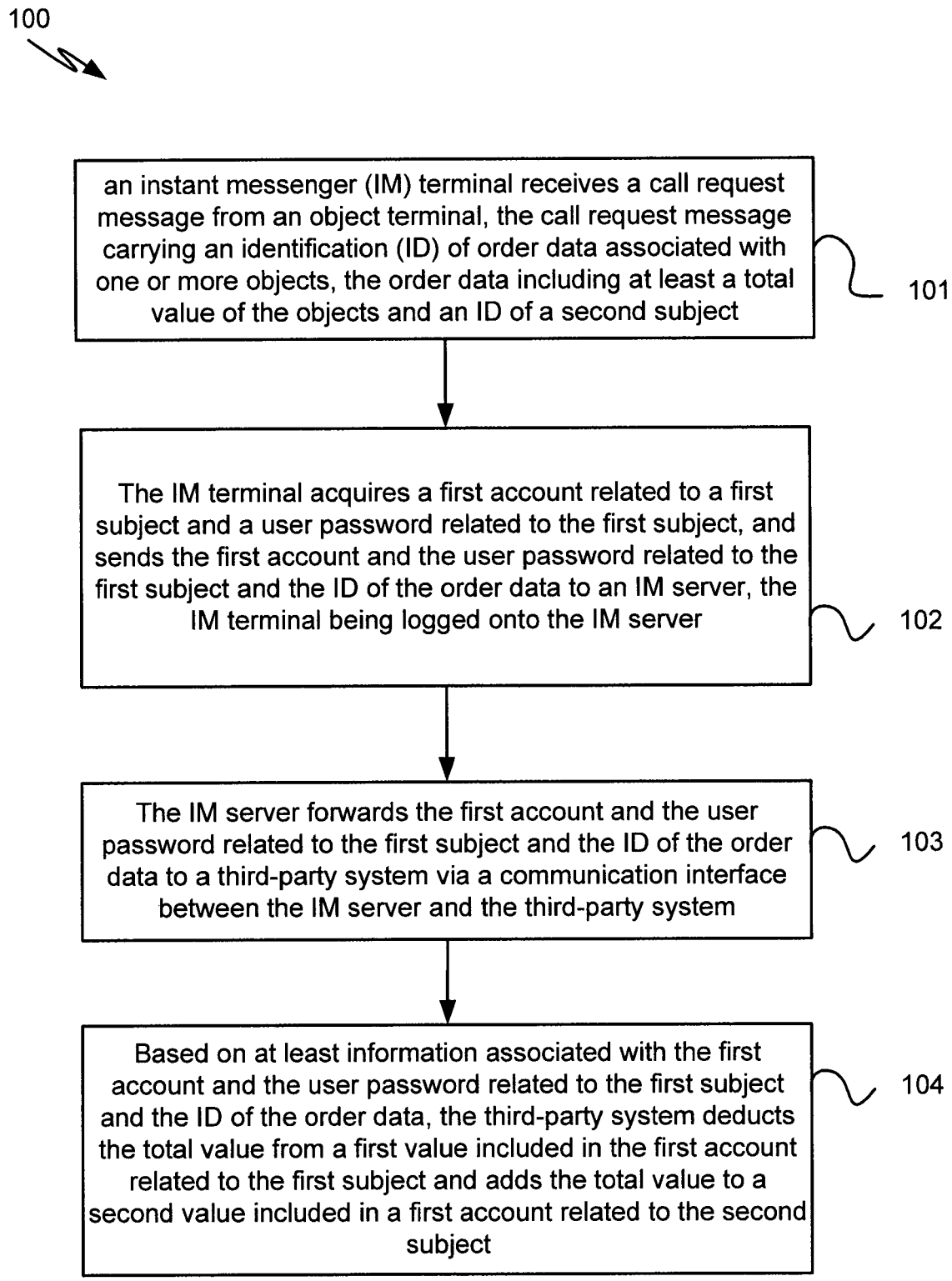
FIG. 1 is a simplified diagram showing a method for processing objects according to one embodiment of the present invention.

FIG. 1 is a simplified diagram showing a method for processing objects according to one embodiment of the present invention. This diagram is merely an example, which should not unduly limit the scope of the claims. One of ordinary skill in the art would recognize many variations, alternatives, and modifications. The method 100 includes at least the process 101 for receiving a call request message, the process 102 for acquiring a first account related to a first subject and a user password related to the first subject and sending the first account related to the first subject, the user password related to the first subject and an identification (ID) of order data, the process 103 for forwarding the first account related to the first subject, the user password related to the first subject and the ID of the order data, and the process 104 for deducting the total value from a first value included in the first account related to the first subject and adding the total value to a second value included in a first account related to the second subject.

According to one embodiment, during the process 101, an instant messenger (IM) terminal receives a call request message from an object terminal, where the call request message carries an identification (ID) of order data of one or more objects, and the order data include at least a total value of the objects and an ID of a second subject. For example, during the process 102, the IM terminal acquires a first account and a user password related to a first subject and sends the first account related to the first subject and the user password related to the first subject as well as the ID of the order data to an IM server, where the IM terminal has logged onto the IM server. In another example, during the process 103, the IM server forwards the first account and the user password related to the first subject as well as the ID of the order data to a third-party system via a communication interface between the IM server and the third-party system. In yet another example, during the process 104, according to the first account related to the first subject and the user password related to the first subject as well as the ID of the order data, the third-party system deducts the total value from a first value included in the first account related to the first subject and adds the total value to a second value included in a first account of a second subject.

According to another embodiment, during the process 102, the IM terminal acquires the first account related to the first subject according to a second account related to the first subject and receives a user-password input by the first subject, where the second account is an account which the first subject registers with the IM server. Alternatively, during the process 102, the IM terminal receives the first account and the user password related to the first subject. For example, the IM terminal sends to the IM server an inquiry message for the first account, where the inquiry message carries the second account related to the first subject so that the IM server forwards the message to the third-party system. In another example, according to the second account, the third-party system acquires the first account related to the first subject from a stored mapping between the first account and the second account and sends the first account related to the first subject to the IM server so that the IM server forwards the first account related to the first subject to the IM terminal.

According to yet another embodiment, during the process 104, the third-party system acquires the order data according to the ID of the order data and acquires the first account related to the second subject according to the ID of the second subject included in the order data. For example, the third-party system validates the user password related to the first subject according to a stored mapping between the first account and the user password as well as the first account related to the first subject. As an example, if the validation is successful, the third-party system deducts the total value from the first value included in the first account related to the first subject and adds the total value to the second value included in the first account related to the second subject.

In one embodiment, before the IM terminal receives the call request message from the object terminal, a background server related to the second subject encrypts the ID of the order data via a first encryption key and sends the encrypted ID of the order data to the object terminal. For example, before the IM terminal acquires the first account related to the first subject and the user password related to the first subject, the IM terminal decrypts the ID of the order data via a first decryption key corresponding to the first encryption key and, upon successful decryption, performs the operation of acquiring the first account related to the first subject and the user password related to the first subject. As an example, before the background server related to the second subject encrypts the ID of the order data via the first encryption key, the background server related to the second subject performs a first encryption of the ID of the order data via a second encryption key. In another example, via the first encryption key, the background server related to the second subject performs a second encryption of the ID of the order data which has undergone the first encryption. In yet another example, before the third-party system deducts the total value from a first value included in the first account related to the first subject and adds the total value to a second value included in a first account related to the second subject, the third-party system decrypts the ID of the order data via a second decryption key corresponding to the second encryption key and upon successful decryption, performs the operation of deducting the total value from the first value included in the first account related to the first subject and adding the total value to the second value included in the first account related to the second subject according to the first account related to the first subject and the user password related to the first subject as well as the ID of the order data.

In another embodiment, before the IM terminal acquires a first account and a user password related to a first subject, the IM terminal sends the second account, the first account related to the first subject and the user password related to the first subject to the third-party system so that the third-party system establishes a mapping between the second account and the first account related to the first subject and another mapping between the first account related to the first subject and the user password related to the first subject. For example, after deducting the total value from the first value included in the first account related to the first subject and adding the total value to the second value included in the first account related to the second subject, the third-party system sends processing results to the IM server so that the IM server returns the processing results to the IM terminal. In another example, the IM terminal notifies the object terminal of the processing results so that the object terminal displays the processing results.

In some embodiments, the IM terminal is installed on a mobile communication device for processing the objects. As an example, the IM terminal and the object terminal are two different hardware devices, or two different clients installed on a same hardware device. In certain embodiments, the IM terminal remains logged onto the IM server after the IM terminal begins operations. For example, the IM terminal sends directly to the IM server the ID of order data of the objects and the first account and the user password related to the first subject. As an example, as the IM server enables direct communication via the communication interface with the third-party system, the IM server sends directly to the third-party system the ID of order data of the objects and the first account and the user password related to the first subject. A login process related to the third-party system is omitted for processing the objects so as to improve the efficiency, according to some embodiments.

Figure 2A:
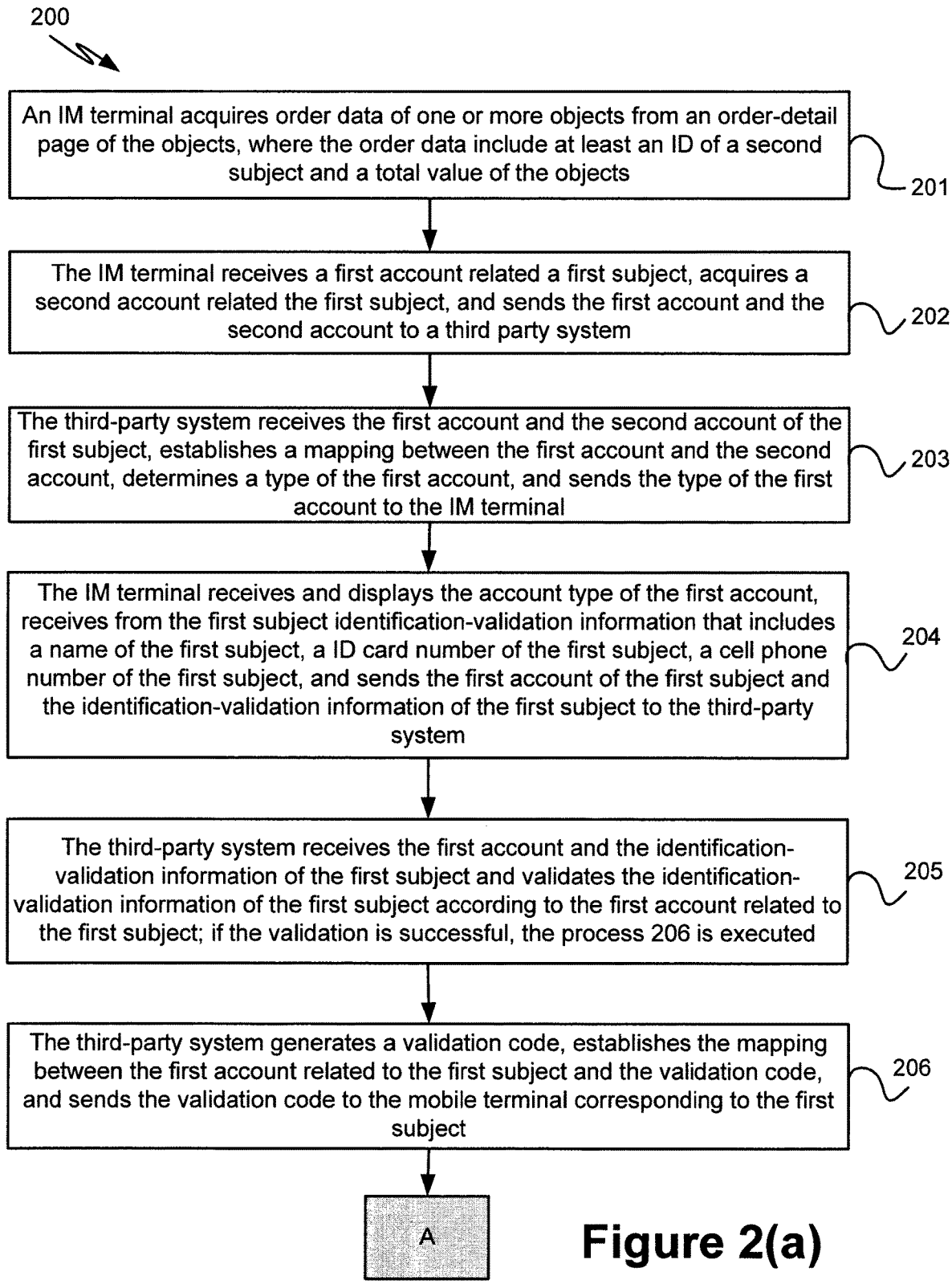
FIG. 2(a) and FIG. 2(b) are simplified diagrams showing a method for processing objects according to another embodiment of the present invention.
Figure 2B:
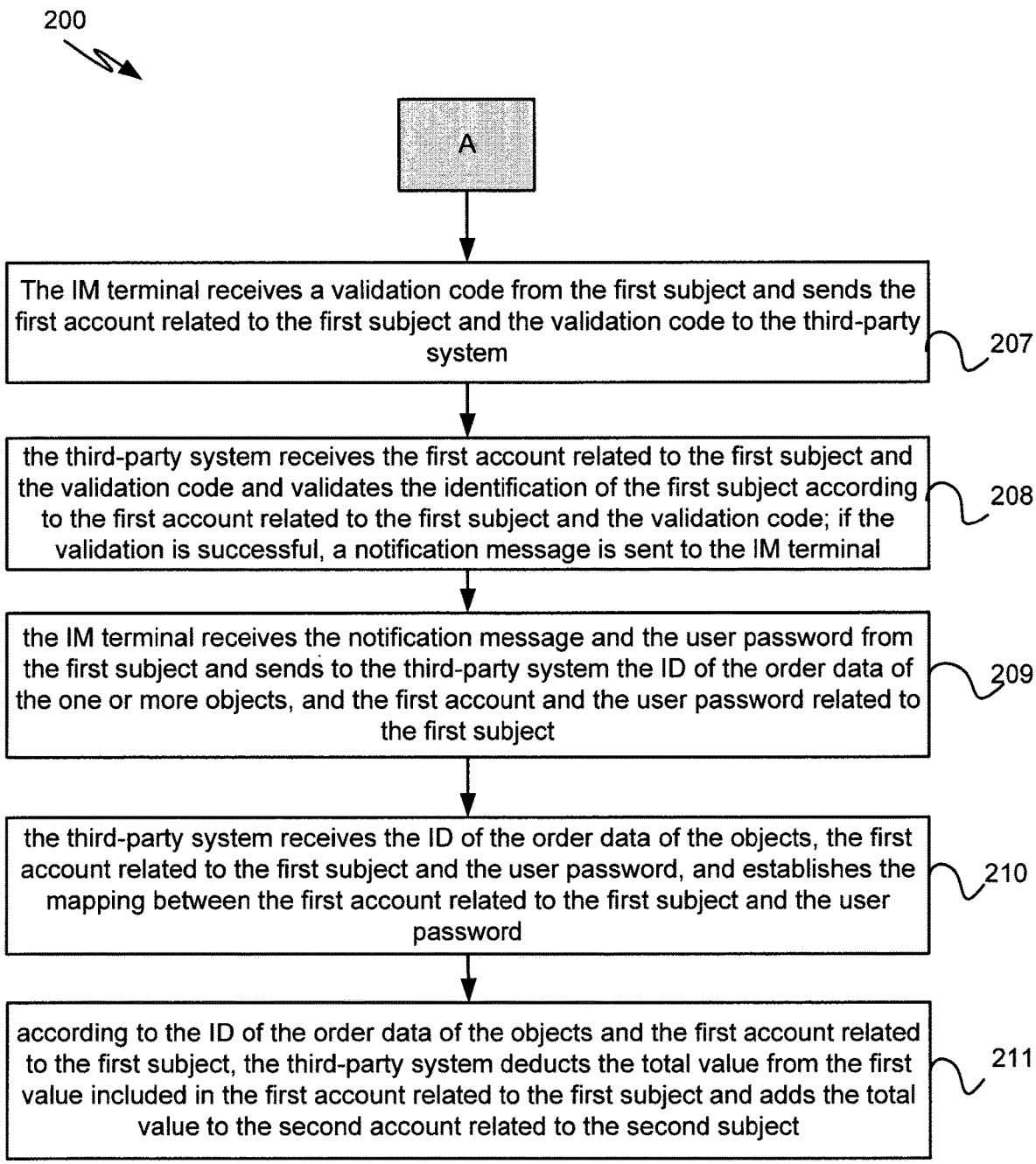

FIG. 2(a) and FIG. 2(b) are simplified diagrams showing a method for processing objects according to another embodiment of the present invention. This diagram is merely an example, which should not unduly limit the scope of the claims. One of ordinary skill in the art would recognize many variations, alternatives, and modifications.

When a first subject uses an IM terminal to process one or more objects for a first time, a third-party system establishes a mapping between a first account related to the first subject and a second account related to the first subject and another mapping between the first account related to the first subject and a user password related to the first subject, where the first account is an account which the first subject registers with the third-party system or a banking system and the second account is an account which the first subject registers with the IM server, according to some embodiments. As shown in FIG. 2(a) and FIG. 2(b), when the first subject uses the IM terminal to process the objects for the first time, the method 200 that includes at least the processes 201-210 is executed to process the objects and establish the mapping between the first account related to the first subject and the second account related to the first subject and the mapping between the first account related to the first subject and the user password related to the first subject, in certain embodiments.

According to one embodiment, during the process 201, the IM terminal acquires order data of the objects from an order-detail page of the objects, where the order data include at least an ID of a second subject and a total value of the one or more objects. For example, the first subject uses a mobile terminal to access a background server related to the second subject. As an example, the background server related to the second subject sends the object-detail page to the mobile terminal, where the object-detail page includes at least the ID of the one or more objects and a description of the objects. In another example, the first subject selects the one or more objects and the number of the objects to be processed on the object-detail page. In yet another example, the mobile terminal sends the ID of the objects and the number of the objects to the background server related to the second subject.

According to another embodiment, the background server related to the second subject generates the order data of the objects according to the ID of the second subject, the ID of the objects and the number of the objects, where the order data include at least the ID of the second subject and the total value of the objects. For example, the background server related to the second subject sends the order-detail page to the mobile terminal, where the order-detail page includes at least the order data. In another example, the background server related to the second subject acquires the ID of the second subject stored on the background server, and acquires the description of the objects according to the ID of the objects, where the description includes at least unit values of the one or more objects, names of the one or more objects and/or colors of the one or more objects. In yet another example, the background server related to the second subject calculates the total value of the objects according to the unit values and the number of the objects, and generates the order data of the objects, where the order data include at least the ID of the second subject, the total value of the objects, the description of the objects, and/or the names of the second subject, etc.

In one embodiment, the mobile terminal receives the order-detail page sent by the background server related to the second subject and displays the received order-detail page. For example, the first subject submits a processing command to the order-detail page that may call the IM terminal installed on the mobile terminal. In another example, the IM terminal acquires the order data of the one or more objects from the order-detail page. In yet another example, the background server related to the second subject sends the order data of the one or more objects to the third-party system.

Figure 3:
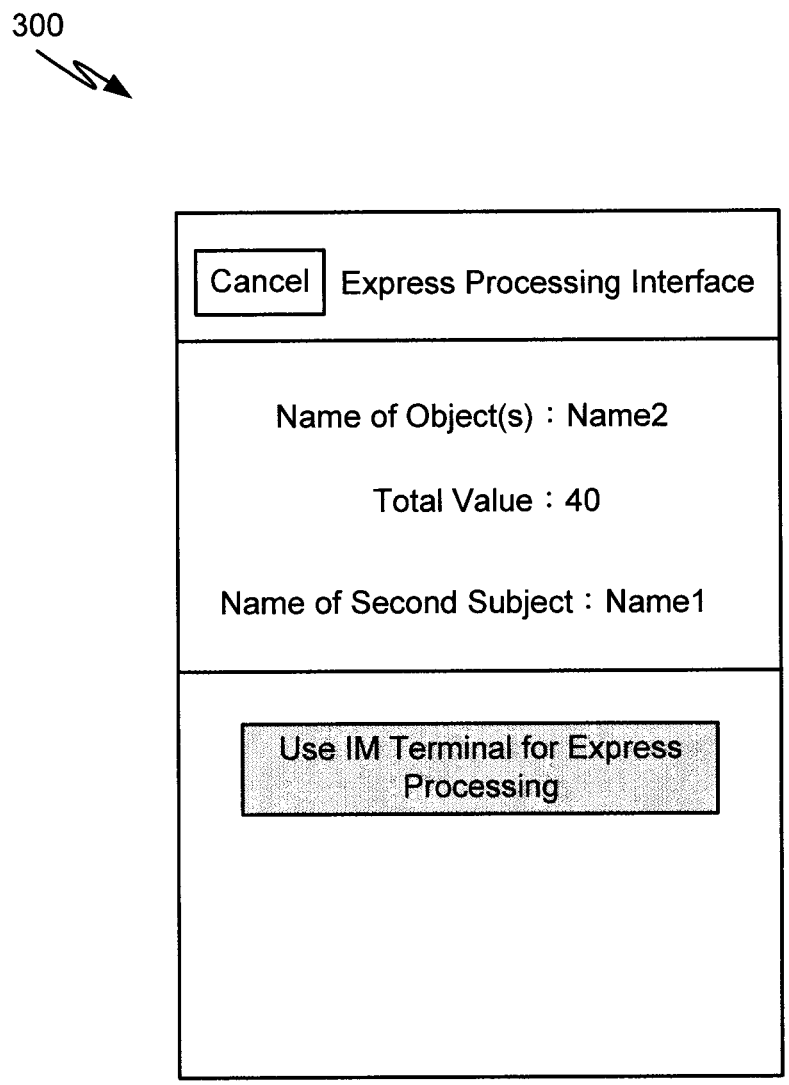
FIG. 3 is a simplified diagram showing an interface for processing objects according to one embodiment of the present invention.

FIG. 3 is a simplified diagram showing an interface for processing objects according to one embodiment of the present invention. This diagram is merely an example, which should not unduly limit the scope of the claims. One of ordinary skill in the art would recognize many variations, alternatives, and modifications. As shown in FIG. 3, the IM terminal acquires the order data of the objects from the order-detail page, where the order data include the ID of the second subject, the total value "40" of the objects, the name "Name 1" of the second subject and the name "Name 2" of the objects, in some embodiments. For example, the IM terminal creates an express processing interface 300 that includes a "Use IM terminal for Express Processing" button, and displays, on the express processing interface 300, the total value "40" of the objects, the name "Name 1" of the second subject and the name "Name 2" of the objects that are included in the order data of the objects.

Referring back to FIG. 2(a) and FIG. 2(b), during the process 202, the IM terminal receives the first account related to the first subject, acquires the second account related to the first subject stored in the IM terminal, and sends the first account and the second account related to the first subject to the third-party system, in some embodiments. For example, the first subject submits a command to the IM terminal using the "Use IM terminal for Express Processing" button.

Figure 4:
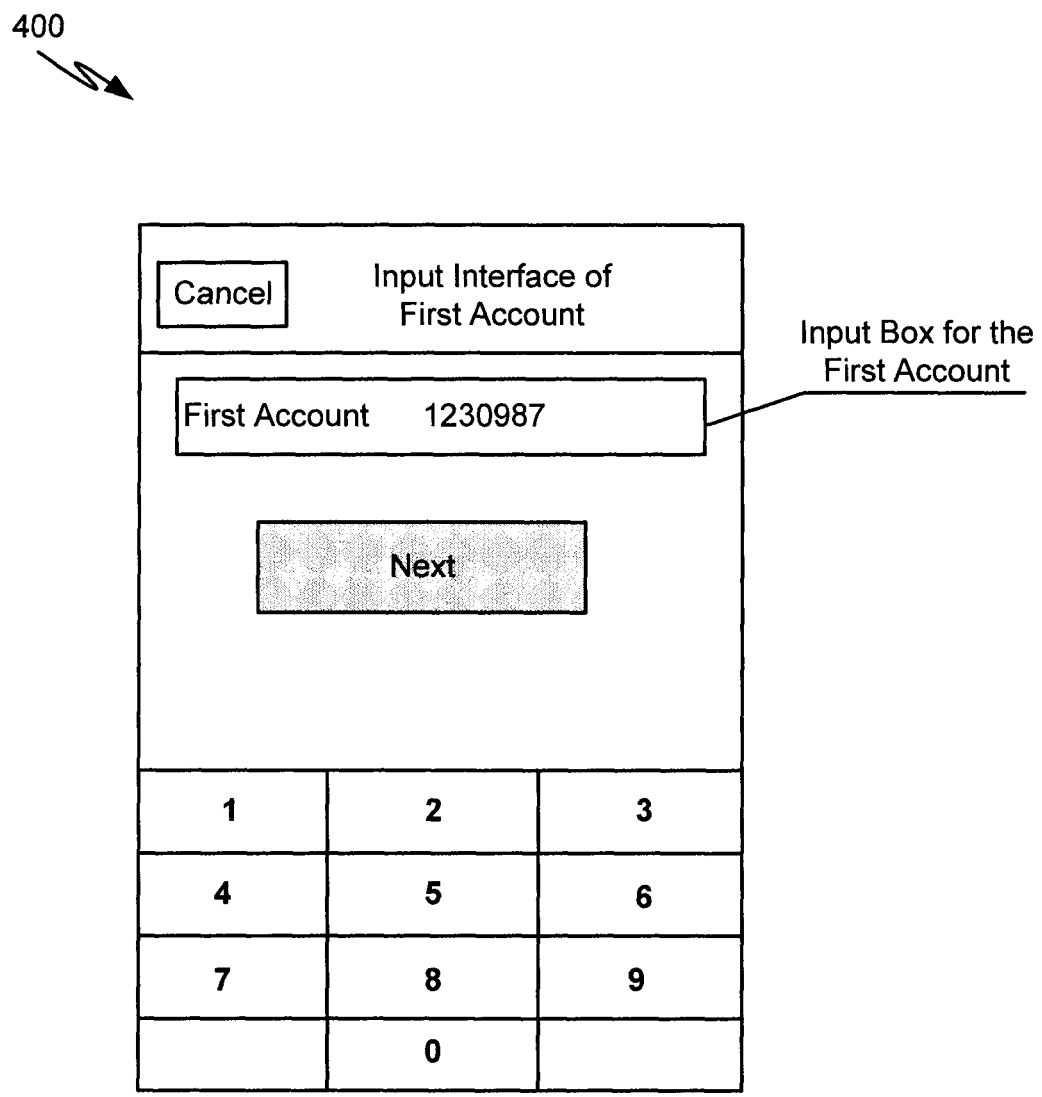
FIG. 4 is a simplified diagram showing an interface for inputting an account according to one embodiment of the present invention.

FIG. 4 is a simplified diagram showing an interface for inputting an account according to one embodiment of the present invention. This diagram is merely an example, which should not unduly limit the scope of the claims. One of ordinary skill in the art would recognize many variations, alternatives, and modifications.

As shown in FIG. 4, the IM terminal receives the command and creates an input interface of the first account 400 which includes an input box for the first account and a "Next" button, in some embodiments. For example, the first subject inputs the first account "1230987" related to the first subject in the input box for the first account and then presses the "Next" button to submit the command to the IM terminal. In another example, the IM terminal receives the command, acquires the first account "1230987" of the first subject from the input box for the first account, acquires the second account "456789" of the first subject stored in the IM terminal and sends to the third-party system the first account "1230987" and the second account "456789" of the first subject.

Referring back to FIG. 3, during the process 203, the third-party system receives the first account and the second account of the first subject, establishes a mapping between the first account and the second account of the first subject, determines a type of the first account and sends the determined type of the first account to the IM terminal, in certain embodiments. For example, the third-party system receives the first account and the second account of the first subject, stores the first account and the second account of the first subject in the mapping between the first account and the second account of the first subject, and determines the value range of the first account related to the first subject. In another example, the third-party system acquires the account type corresponding to the first account from the mapping between the stored value range and the account type according to the value range of the first account, and sends the account type of the first account to the IM terminal. In yet another example, the third-party system receives the first account "1230987" and the second account "456789" of the first subject, and stores the first account "1230987" and the second account "456789" of the first subject in the mapping between the first account and the second account as shown in Table 1. In yet another example, the third-party system determines the account type of the first account "1230987" as Account Type 1 and sends Account Type 1 of the first account to the IM terminal.

TABLE 1

| First account | Second account |
|---|---|
| 1564888 | 456128 |
| 1665963 | 165648 |
| 1230987 | 456789 |
| . . . | . . . |

According to one embodiment, during the process 204, the IM terminal receives and displays the account type of the first account, and receives from the first subject identification-validation information that includes a name of the first subject, a ID card number of the first subject, a cell phone number of the first subject. For example, the IM terminal sends the first account of the first subject and the identification-validation information of the first subject to the third-party system.

FIG. 5 is a simplified diagram showing an interface for inputting identification-validation information according to one embodiment of the present invention. This diagram is merely an example, which should not unduly limit the scope of the claims. One of ordinary skill in the art would recognize many variations, alternatives, and modifications.

As shown in FIG. 5, the IM terminal receives Account Type 1 of the first account, creates an input interface for the identification-validation information 500 that includes a first input box for a name, a second input box for an ID card number, a third input box for a cell phone number, and a "Next" button, and displays Account Type 1 of the first account in the input interface for the identification-validation information. For example, the first subject inputs the name, the ID card number and the cell phone number of the first subject into the first input box, the second input box and the third input box respectively, and then presses the "Next" button to submit the command to the IM terminal. In another example, the IM terminal receives the command, obtains the identification-validation information of the first subject by acquiring the name, the ID card number and the cell phone number of the first subject from the first input box, the second input box and the third input box respectively, and sends the first account "1230987" of the first subject and the identification-validation information of the first subject to the third-party system.

Referring back to FIG. 2(a) and FIG. 2(b), during the process 205, the third-party system receives the first account and the identification-validation information of the first subject and validates the identification-validation information of the first subject according to the first account related to the first subject; if the validation is successful, the process 206 is executed, in some embodiments. Specifically, the third-party system receives the first account and the identification-validation information of the first subject, and acquires the corresponding identification-validation information from the stored mapping between the first account and the identification-validation information according to the first account related to the first subject, in some embodiments. For example, the third-party system compares the acquired identification-validation information with the identification-validation information of the first subject; if they match, the validation of the identification-validation information of the first subject is successful; if they do not match, the validation of the identification-validation information of the first subject fails.

According to one embodiment, during the process 206, the third-party system generates a validation code, establishes the mapping between the first account related to the first subject and the validation code, and sends the validation code to the mobile terminal corresponding to the first subject. Specifically, the third-party system generates a validation code, establishes the mapping between the first account related to the first subject and the validation code, and sends the validation code to the mobile terminal corresponding to the first subject according to the cell phone number included in the acquired identification-validation information, in some embodiments. For example, the third-party system generates the validation code "abd", establishes the mapping between the first account "1230987" of the first subject and the validation code "abd" (as shown in Table 2), and sends the validation code "abd" to the mobile terminal corresponding to the first subject. In another example, the mobile terminal corresponding to the first subject receives the validation code and then inputs the validation code into the IM terminal.

TABLE 2

| First account(s) | Validation code(s) |
|---|---|
| 1564888 | skd |
| 1665963 | dfs |
| 1230987 | abd |
| ... | ... |

Figure 6:
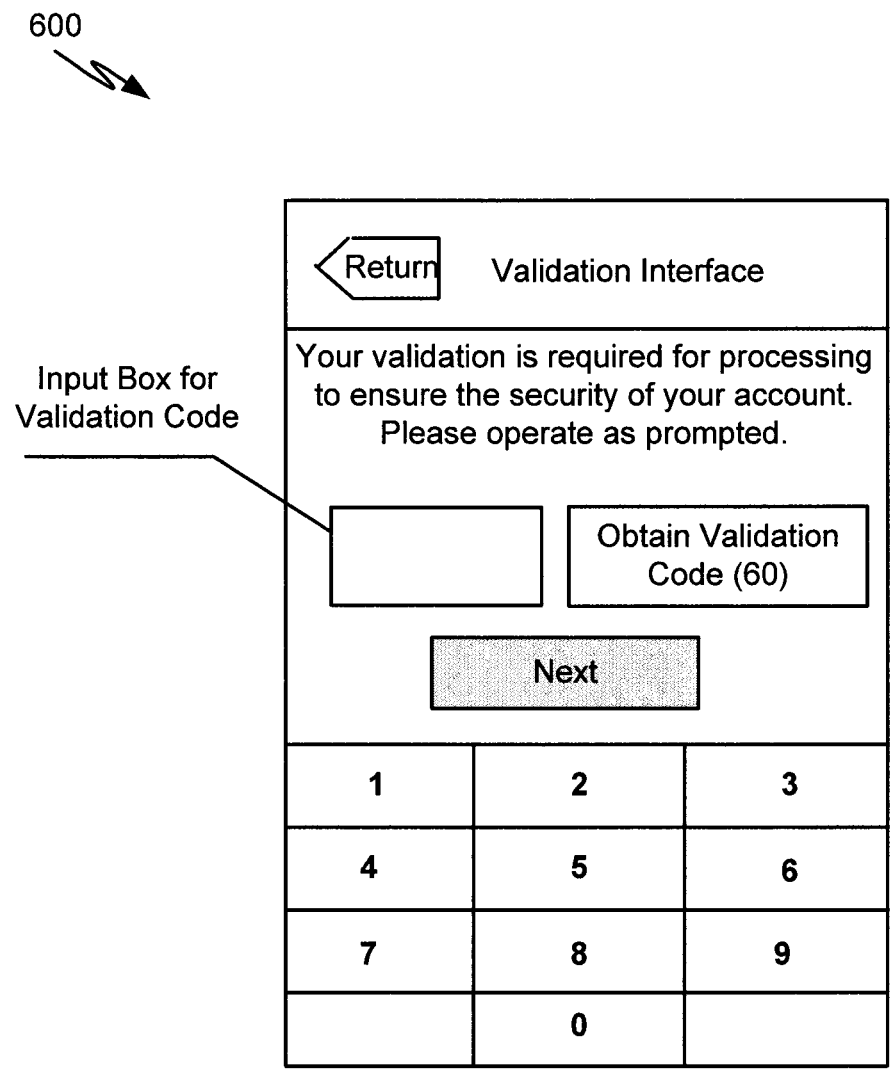
FIG. 6 is a simplified diagram showing a validation interface according to one embodiment of the present invention.

FIG. 6 is a simplified diagram showing a validation interface according to one embodiment of the present invention. This diagram is merely an example, which should not unduly limit the scope of the claims. One of ordinary skill in the art would recognize many variations, alternatives, and modifications.

Referring back to FIG. 2(a) and FIG. 2(b), during the process 207, the IM terminal receives a validation code from the first subject and sends the first account related to the first subject and the validation code to the third-party system, in some embodiments. For example, the IM terminal receives the command and then creates a validation interface 600 (e.g., as shown in FIG. 6) that includes an input box for validation code and a "Next" button. In another example, the first subject inputs the validation code "abd" into the input box for validation code and submits the command to the IM terminal by pressing the "Next" button. In yet another example, the IM terminal receives the command, acquires the validation code "abd" from the input box for validation code, and sends to the third-party system the first account "1230987" of the first subject and the validation code "abd."

Referring to FIG. 2(a) and FIG. 2(b), during the process 208, the third-party system receives the first account related to the first subject and the validation code and validates the identification of the first subject according to the first account related to the first subject and the validation code, in some embodiments. For example, if the validation is successful, a notification message is sent to the IM terminal. As an example, the third-party system receives the first account related to the first subject and the validation code, acquires another validation code from the stored mapping between the first account and the validation code according to the first account related to the first subject, and compares the acquired validation code and the received validation code; if the two validation codes match, the validation of the identification of the first subject is successful and a notification message is sent to the IM terminal; if the two validation codes do not match, the validation of the identification of the first subject fails.

According to one embodiment, the third-party system receives the first account "1230987" of the first subject and the validation code "abd," acquires the other validation code "abd" from the stored mapping between the first account and the validation code (e.g., as shown in Table 2), and compares the acquired validation code "abd" and the received validation code "abd." For example, the two validation codes are the same, so the validation of the identification of the first subject is successful and a notification message is sent to the IM terminal.

Figure 7:
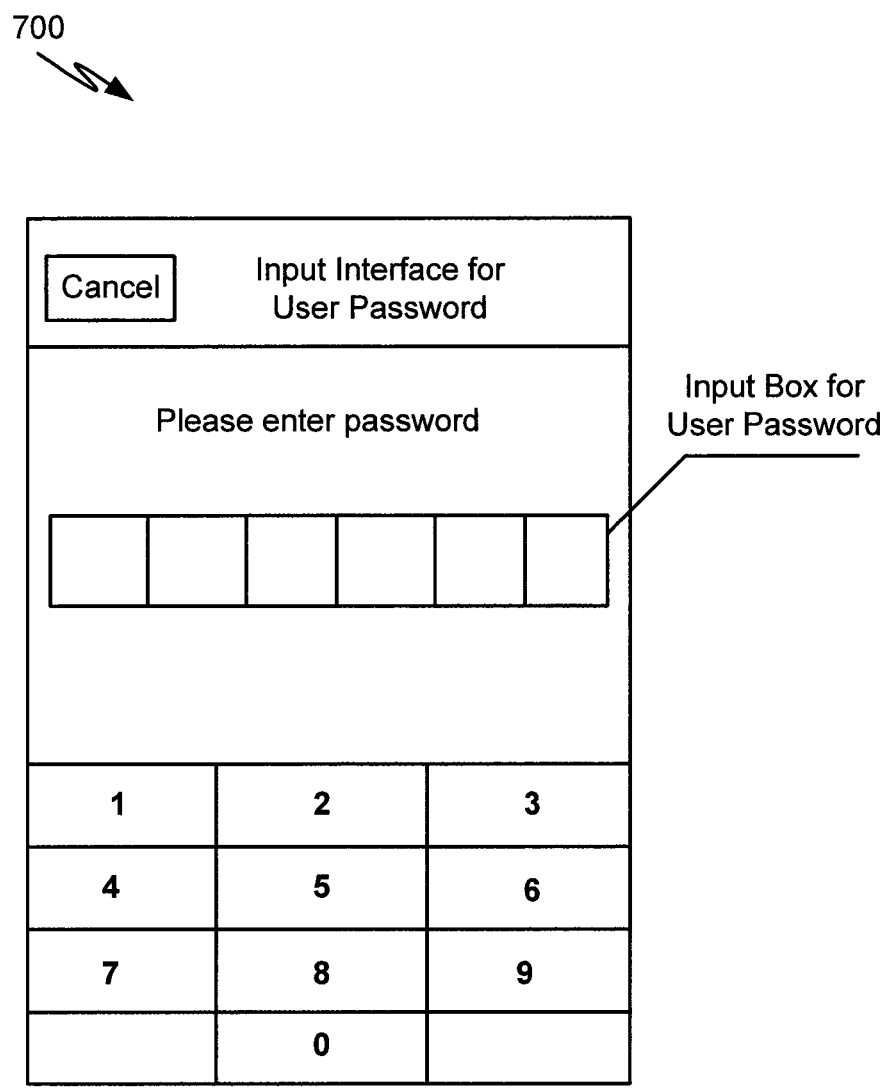
FIG. 7 is a simplified diagram showing an input interface for user password according to one embodiment of the present invention.

FIG. 7 is a simplified diagram showing an input interface for user password according to one embodiment of the present invention. This diagram is merely an example, which should not unduly limit the scope of the claims. One of ordinary skill in the art would recognize many variations, alternatives, and modifications.

Referring to FIG. 2(a) and FIG. 2(b), during the process 209, the IM terminal receives the notification message and the user password from the first subject and sends to the third-party system the ID of the order data of the one or more objects, and the first account and the user password related to the first subject, in some embodiments. Specifically, the IM terminal receives the notification message and creates an input interface for user password 700 (e.g., as shown in FIG. 7) which includes an input box for user password and a "Complete" button, according to one embodiment. For example, the first subject inputs user password "456" into the input box for user password and presses the "Complete" button to submit the command to the IM terminal. In another example, the IM terminal receives the command, acquires user password "456" from the input box for user-password, and sends the ID of the order data of the objects, the first account "1230987" of the first subject and the user password "456" to the third-party system.

Referring to FIG. 2(a) and FIG. 2(b), during the process 210, the third-party system receives the ID of the order data of the objects, the first account related to the first subject and the user password, and establishes the mapping between the first account related to the first subject and the user password, in certain embodiments. For example, the third-party system receives the ID of the order data of the objects, the first account "1230987" of the first subject and the user password "456" and stores the first account "1230987" of the first subject and the user password "456" in the mapping between the first account and the user password as shown in Table 3.

TABLE 3

| First account | User password |
|---|---|
| 1564888 | 485 |
| 1665963 | 894 |
| 1230987 | 456 |
| ... | ... |

In one embodiment, during the process 211, according to the ID of the order data of the objects and the first account related to the first subject, the third-party system deducts the total value from the first value included in the first account related to the first subject and adds the total value to the second account related to the second subject. Specifically, the third-party system acquires the order data of the objects according to the ID of the order data of the objects, in certain embodiments. For example, according to the ID of the second subject included in the order data of the objects, the third-party system acquires the first account related to the second subject from the stored mapping between the ID of the second subject and the first account related to the second subject. As an example, the third-party system deducts the total value from the first value included in the first account related to the first subject and adds the total value to the second value included in the first account related to the second subject.

In certain embodiments, a process during which the third-party system validates the user password related to the first subject according to the stored mapping between the first account and the user password as well as the first account related to the first subject includes: the third-party system acquires the user password from the stored correspondence between the first account and the user password according to the first account related to the first subject and compares the acquired user password and the user password input by the first subject. For example, if the acquired user password and the input user password are the same, the validation of the user password related to the first subject is successful. In another example, if the two user passwords are different, the validation of the user password related to the first subject fails.

In some embodiments, the first subject may directly input the first account and the user password related to the first subject into the IM terminal. For example, the IM terminal receives the first account and user password related to the first subject and sends the first account, the second account and the user password related to the first subject to the third-party system. In another example, the third-party system establishes the mapping between the first account and the second account related to the first subject and the mapping between the first account and the user password of the first account. Specifically, the IM terminal receives the first account and the user-password input by the first subject and sends the second account, the first account and the user password related to the first subject to the third-party system, in certain embodiments. For example, the third-party system receives the second account, the first account and the user password related to the first subject from the IM terminal, stores the second account and the first account related to the first subject in the mapping between the second account and the first account, and stores the first account related to the first subject and the user password related to the first subject in the mapping between the first account and the user password. In yet another example, the second account related to the first subject is an account which the first subject registers with the IM server in advance. In yet another example, the first subject is a user, etc. In yet another example, the second account is a WeChat number, etc. For example, the first account is a bank card number, etc. In another example, the user password is a payment password, etc. In yet another example, the third-party system is a third-party payment system, etc.

According to one embodiment, the IM terminal receives the first account from the first subject and acquires the second account related to the first subject stored in the IM terminal. For example, the IM terminal sends the first account and the second account related to the first subject to the third-party system. In another example, the third-party system establishes the mapping between the first account and the second account related to the first subject according to the first account and the second account related to the first subject, so as to tie the first account related to the first subject with the second account related to the first subject in the third-party system. In yet another example, when the first subject processes the objects using the IM terminal next time, the first subject does not need to input the first account again so that the processing efficiency is improved. As an example, when the first account and the second account related to the first subject are tied together, the third-party system sends a validation code to the IM terminal, and the third-party system uses this validation code to validate the identification of the first subject, so as to ensure the security of the first account related to the first subject.

Figure 8:
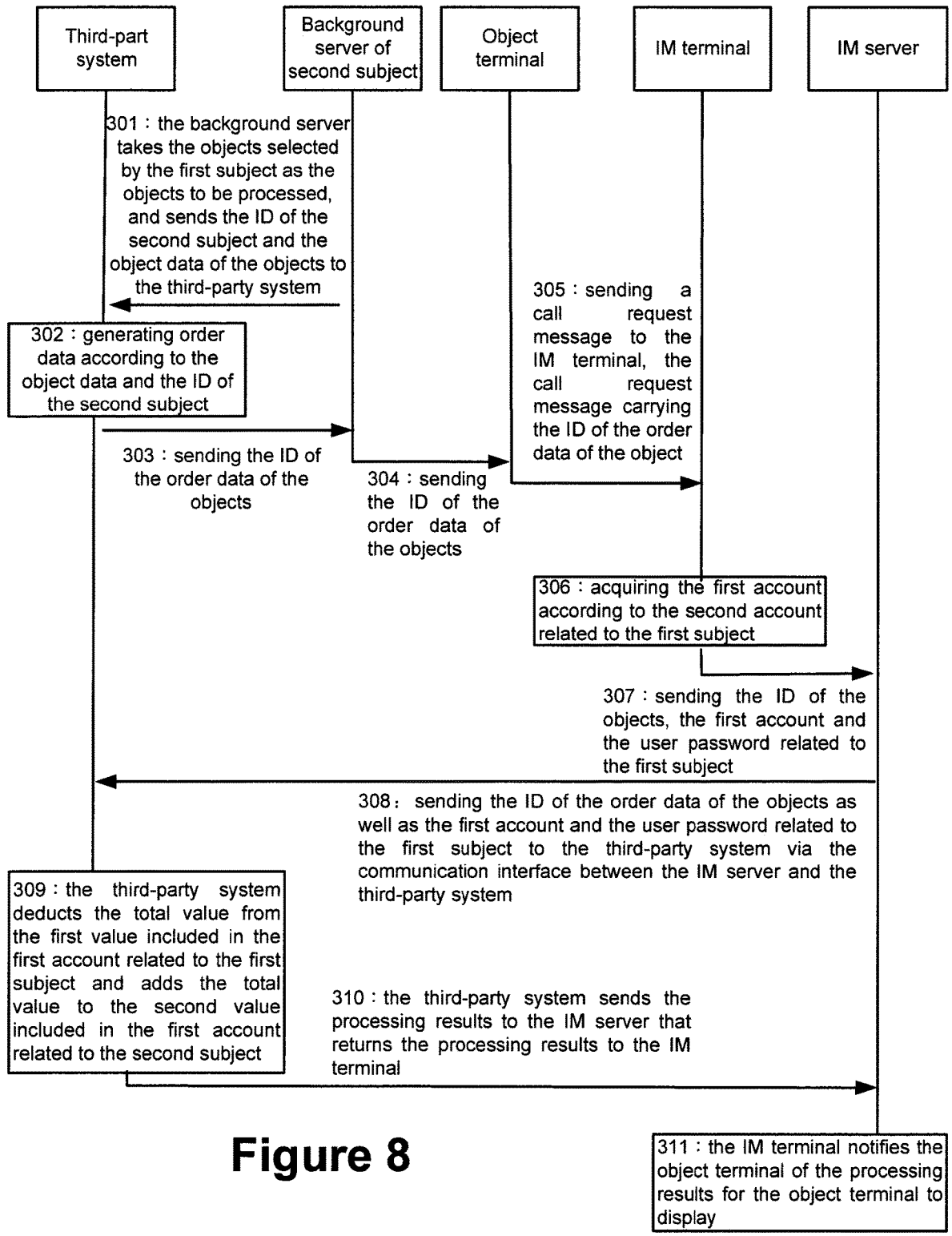
FIG. 8 is a simplified diagram showing object processing using certain systems according to one embodiment of the present invention.

FIG. 8 is a simplified diagram showing object processing using certain systems according to one embodiment of the present invention. This diagram is merely an example, which should not unduly limit the scope of the claims. One of ordinary skill in the art would recognize many variations, alternatives, and modifications.

As shown in FIG. 8, if the first subject selects the objects after the third-party system establishes the mapping between the first account related to the first subject and the second account related to the first subject and the mapping between the first account related to the first subject and the user password related to the first subject, the IM terminal is used to process the objects, in some embodiments. For example, at the process 301, the background server related to the second subject takes the one or more objects selected by the first subject as the objects to be processed, and sends the ID of the second subject and the object data of the objects to the third-party system, where the object data includes at least the total value of the objects. In another example, the first subject sends an access request message to the background server related to the second subject via the object terminal. In yet another example, the background server related to the second subject receives the access request message and sends the object-detail page to the object terminal according to the access request message, where the object-detail page includes IDs of one or more original objects and the description of the original objects. In yet another example, the object terminal receives and displays the object-detail page to the first subject.

According to one embodiment, the first subject can select the one or more objects from the original objects included on the object-detail page and determines the number of the selected objects. For example, the object terminal sends the ID and the number of the one or more objects selected by the first subject to the background server related to the second subject. In another example, the background server of the second subject receives from the object terminal the ID and the number of the objects selected by the first subject, takes the objects selected by the first subject as the objects to be processed, and acquires the description of the objects to be processed according to the ID of the objects. As an example, the description includes at least unit values of the objects. For example, the background server calculates the total value of the objects according to the unit values and number of the objects to be processed, and generates object data of the objects, where the object data includes at least the total value of the objects. In another example, the description further includes the names of the objects and/or the colors of the objects. In yet another example, the object data includes the names of the objects, the colors of the objects, the mailing address of the first subject, and/or the name of the second subject. As an example, the first subject is a user, etc.; the second subject is a merchant, etc. In one embodiment, when the second subject is a merchant, the one or more objects includes a commodity; the object-detail page corresponds to a commodity detail page; and the ID of the second subject includes a merchant number.

According to another embodiment, during the process 302, the third-party system receives the object data of the objects and the ID of the second subject from the background server related to the second subject and generates the order data which includes at least the total value of the objects and the ID of the second subject. Specifically, the third-party system packages the object data of the objects and the ID of the second subject into the order data and designates an ID for the packaged order data, where the designated ID is used to uniquely identify the packaged order data, in certain embodiments. For example, the order data further includes the names of the objects, the colors of the objects, the mailing address of the first subject, and/or the name of the second subject.

According to yet another embodiment, during the process 303, the third-party system sends the ID of the order data of the objects to the background server related to the second subject. For example, during the process 304, the background server related to the second subject receives the ID of the order data of the objects from the third-party system and sends the ID of the order data of the objects to the object terminal. In another example, the background server related to the second subject agrees with the third-party system on one or more second encryption keys and one or more second decryption keys in advance, where the second encryption keys are stored in the background server related to the second subject and the second decryption keys are stored in the third-party system. In yet another example, the background server related to the second subject agrees with the IM terminal on one or more first encryption keys and one or more first decryption keys in advance, where the first encryption keys are stored in the background server related to the second subject and the first decryption keys are stored in the IM terminal. In yet another example, the background server related to the second subject uses the second encryption keys to encrypt the ID of the order data for the first time. As an example, further, the second subject uses the second encryption keys to encrypt the ID of the order data of the objects for the first time, uses the first encryption keys for the second encryption of the ID of the order data of the objects which has undergone the first encryption, and then sends the ID of the order data of the objects which has undergone the second encryption to the object terminal.

In one embodiment, during the process 305, the object terminal receives the ID of the order data of the objects from the background server related to the second subject and sends a call request message to the IM terminal, where the call request message carries the ID of the order data of the objects. For example, both the object terminal and the IM terminal are installed in a same mobile terminal (e.g., a cell phone). In another embodiment, during the process 306, the IM terminal receives the call request message from the object terminal and acquires the first account related to the first subject according to the second account related to the first subject. Specifically, the IM terminal receives the call request message from the object terminal and sends to the IM server an inquiry message about the first account, where the message carries the second account related to the first subject, in some embodiments. For example, the IM server receives the inquiry message and forwards the message to the third-party system. In another example, the third-party system receives the inquiry message, acquires the first account related to the first subject from the stored mapping between the first account and the second account according to the second account related to the first subject in the inquiry message, and sends the first account related to the first subject to the IM server. In yet another example, the IM server receives the first account related to the first subject and forwards the first account related to the first subject to the IM terminal. As an example, the IM terminal receives the first account related to the first subject.

In another embodiment, if the ID of the order data of the objects has been encrypted once, the IM terminal decrypts the ID of the order data of the objects with the first decryption keys corresponding to the first encryption keys. For example, upon successful decryption, the first account related to the first subject is acquired according to the second account related to the first subject. In another example, if the ID of the order data of the objects is not encrypted, the inquiry message further carries the ID of the order data of the objects. As an example, the third-party system acquires and sends the order data of the objects according to the ID of the order data of the objects together with the first account related to the first subject to the IM terminal. For example, if the ID of the order data of the objects has been encrypted twice, the inquiry message further carries the decrypted ID of the order data of the objects. In another example, the third-party system decrypts the ID of the order data of the objects with the second decryption keys corresponding to the second encryption keys. In yet another example, upon successful decryption, the order data of the objects are acquired and sent according to the ID of the order data of the objects together with the first account related to the first subject to the IM terminal.

In yet another embodiment, the IM terminal receives the call request message from the object terminal and sends the inquiry message to the IM server. For example, the inquiry message carries the second account "456789" of the first subject and the ID of the order data of the objects. As an example, the IM server then forwards the message to the third-party system. In another example, the third-party system acquires the first account "1230987" of the first subject from the mapping between the first account and the second account (e.g., as shown in Table 1) according to the second account "456789," and acquires the order data of the objects according to the ID of the order data of the objects. For example, the order data include the ID of the second subject, the total value "40" of the objects, the name "Name 1" of the second subject and the name "Name 2" of the objects. In another example, the third-party system then sends the first account related to the first subject and the order data of the objects to the IM server which then forwards them to the IM terminal.

According to one embodiment, the IM terminal receives the first account related to the first subject and the order data of the objects, and establishes the express processing interface 300 (e.g., shown in FIG. 3). For example, the express processing interface includes an input box for user password and a "Process" button. In another example, the first account "1230987," the order data of the objects (including the total value "40" of the object), the name "Name 1" of the second subject, and the name "Name 2" of the objects are displayed on the express processing interface.

According to another embodiment, during the process 307, the IM terminal receives the user-password input by the first subject, sends the ID of the objects as well as the first account and the user password related to the first subject to the IM server. For example, the first subject can directly input the first account related to the first subject and the user password related to the first subject into the IM terminal. As an example, the IM terminal receives the first account related to the first subject and the user password related to the first subject input by the first subject. According to yet another embodiment, during the process 308, the IM server receives the ID of the order data of the objects as well as the first account and the user password related to the first subject from the IM terminal, and sends the ID of the order data of the objects as well as the first account and the user password related to the first subject to the third-party system via the communication interface between the IM server and the third-party system.

In one embodiment, during the process 309, according to the first account and the user password related to the first subject as well as the ID of the order data of the objects, the third-party system deducts the total value from the first value included in the first account related to the first subject and adds the total value to the second value included in the first account related to the second subject. For example, the third-party system acquires the order data of the objects according to the ID of the order data of the objects, and acquires the first account related to the second subject from the stored mapping between the ID of the second subject and the first account related to the second subject according to the ID of the second subject included in the order data of the objects. In another example, the third-party system validates the user password related to the first subject according to the stored mapping between the first account and the user password as well as the first account related to the first subject. If the validation is successful, the third-party system deducts the total value from the first value included in the first account related to the first subject and adds the total value to the second value included in the first account related to the second subject, in certain embodiments.

In some embodiments, the process during which the third-party system validates the user password related to the first subject according to the stored mapping between the first account and the user password as well as the first account related to the first subject includes: the third-party system acquires the user password from the stored mapping between the first account and the user password according to the first account related to the first subject, and compares the acquired user password and a user password input by the first subject. For example, if the two user passwords are the same, the validation of the user password related to the first subject is successful; if the two are different, the validation of the user password related to the first subject fails.

In certain embodiments, if the ID of the order data of the objects has been encrypted twice, the third-party system decrypts the ID of the order data of the objects with the first decryption keys corresponding to the first encryption keys. For example, upon successful decryption, the third-party system deducts the total value from the first value included in the first account related to the first subject and adds the total value to the second value included in the first account related to the second subject. For example, before the third-party system, according to the first account and the user password related to the first subject as well as the ID of the order data of the objects, deducts the total value from the first value included in the first account related to the first subject and adds the total value to the second value included in the first account related to the second subject, the identification of the first account related to the first subject is validated.

Specifically, the third-party system generates a validation code, establishes a mapping between the second account related to the first subject and the validation code, acquires the identification-validation information of the first subject according to the first account related to the first subject, and sends the validation code to the mobile terminal corresponding to the first subject according to the cell phone number included in the identification-validation information, in some embodiments. For example, after the mobile terminal corresponding to the first subject receives the validation code, the first subject inputs the validation code into the IM terminal. In another example, the IM terminal receives the validation code input by the first subject, and sends the second account related to the first subject and the validation code to the third-party system. In yet another example, the third-party system receives the second account related to the first subject and the validation code, acquires another validation code from the stored mapping between the second account and the validation code according to the second account related to the first subject, and compares the acquired validation code with the received validation code. For example, if the two validation codes are the same, the validation of the identification of the first subject is successful; if the two are different, the validation fails. In another example, upon successful validation of the identification of the first subject, the third-party system, according to the first account and the user password related to the first subject as well as the ID of the order data of the objects, deduct the total value from the first value included in the first account related to the first subject and add the total value to the second value included in the first account related to the second subject. In yet another example, if the validation of the identification of the first subject fails, the operation ends.

According to certain embodiments, during the process 310, the third-party system sends the processing results to the IM server, and the IM server returns the processing results to the IM terminal. Specifically, the third-party system sends the processing results to the IM server, and the IM server receives the processing results from the third-party system and returns the processing results to the IM terminal. According to some embodiments, during the process 311, the IM terminal notifies the object terminal of the processing results, and the object terminal displays the processing results. Specifically, the IM terminal receives the processing results from the IM server and sends the processing results to the object terminal; and the object terminal receives and displays the processing results from the IM terminal.

In one embodiment, the third-party system sends a notification message to the background server related to the second subject after processing the objects, where the notification message carries the ID of the order data of the objects. For example, after the background server related to the second subject receives the notification message, the second subject determines that the first subject has finished processing the objects and starts a goods-delivery process.

In some embodiments, the first account and the second account related to the first subject are tied in the third-party system, so when the first subject processes the objects via the IM terminal next time, it is not necessary to input the first account again and hence the processing efficiency is improved. For example, when the first account and the second account related to the first subject are tied together, the third-party system sends a validation code to the IM terminal, and the third-party system uses this validation code to validate the identification of the first subject, so as to ensure the security of the first account related to the first subject. In certain embodiments, the processing of the objects is realized directly on the IM terminal installed on a mobile terminal.

Figure 9:
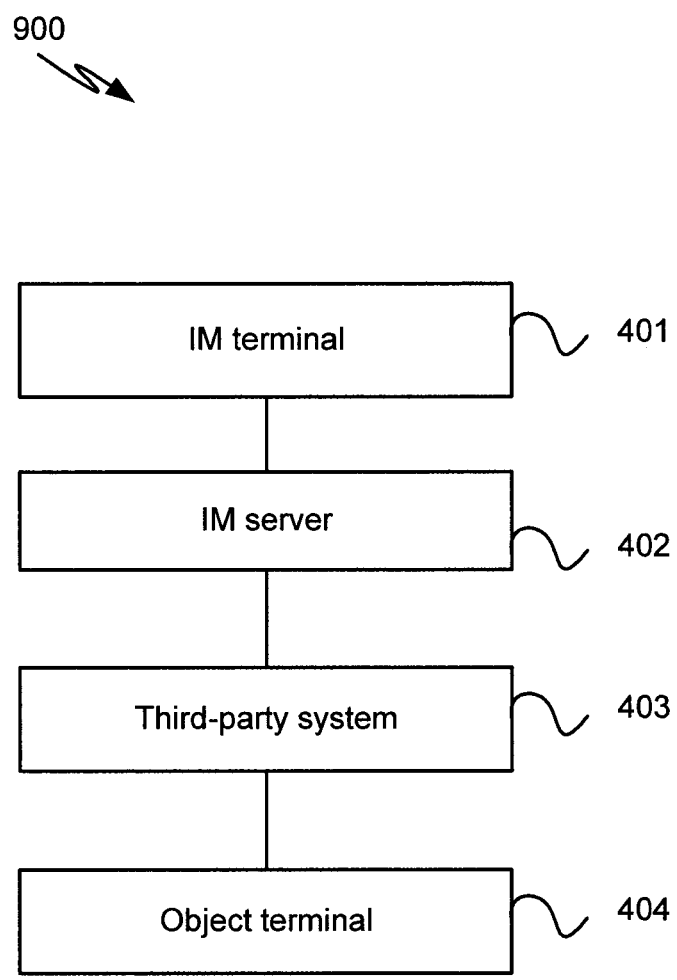
FIG. 9 is a simplified diagram showing a system for processing objects according to one embodiment of the present invention.

FIG. 9 is a simplified diagram showing a system for processing objects according to one embodiment of the present invention. This diagram is merely an example, which should not unduly limit the scope of the claims. One of ordinary skill in the art would recognize many variations, alternatives, and modifications. The system 900 includes an instant messenger (IM) terminal 401, an IM server 402, a third-party system 403, and an object terminal 404.

According to one embodiment, the IM terminal 401 is configured to receive a call request message from an object terminal, the call request message carrying an identification (ID) of order data associated with one or more objects, the order data including at least a total value of the objects and an ID of a second subject. For example, the IM terminal 401 is further configured to acquire a first account related to a first subject and a user password related to the first subject, and send the first account related to the first subject and the user password related to the first subject as well as the ID of the order data to the IM server 402, where the IM terminal 401 has logged onto the IM server 402. In another example, the IM server 402 is further configured to forward the first account and the user password related to the first subject as well as the ID of the order data to the third-party system 403 via a communication interface between the IM server 402 and the third-party system 403. In yet another example, the third-party system 403 is further configured to, based on at least information associated with the first account related to the first subject, the user password related to the first subject and the ID of the order data, deduct the total value from a first value included in the first account related to the first subject and add the total value to a second value included in a first account related to the second subject.

According to another embodiment, the IM terminal 401 is configured to the IM terminal is further configured to acquire the first account related to the first subject based on at least information associated with a second account related to the first subject, the second account being registered with the IM server 402 by the first subject, and receive the user password related to the first subject. For example, the IM terminal 401 is further configured to receive the first account related to the first subject and the user password related to the first subject. In another example, the IM terminal 401 is further configured to send to the IM server 402 an inquiry message for the first account, the inquiry message carrying the second account related to the first subject. In yet another example, the IM server 402 is further configured to forward the inquiry message to the third-party system 403.

According to yet another embodiment, the third-party system 403 is configured to acquire the first account related to the first subject according to a stored mapping between the first account and the second account based on at least information associated with the second account and send the first account related to the first subject to the IM server 402. For example, the IM server 402 is further configured to forward the first account related to the first subject to the IM terminal 401. In another example, the third-party system 403 is configured to acquire the order data according to the ID of the order data and acquire the first account related to the second subject according to the ID of the second subject included in the order data. In yet another example, the third-party system 403 is further configured to validate the user password related to the first subject according to a stored mapping between the first account and the user password and the first account related to the first subject. For example, the third-party system 403 is further configured to, upon successful validation of the user password related to the first subject, deduct the total value from the first value included in the first account related to the first subject and add the total value to the second value included in the first account related to the second subject.

Figure 10:
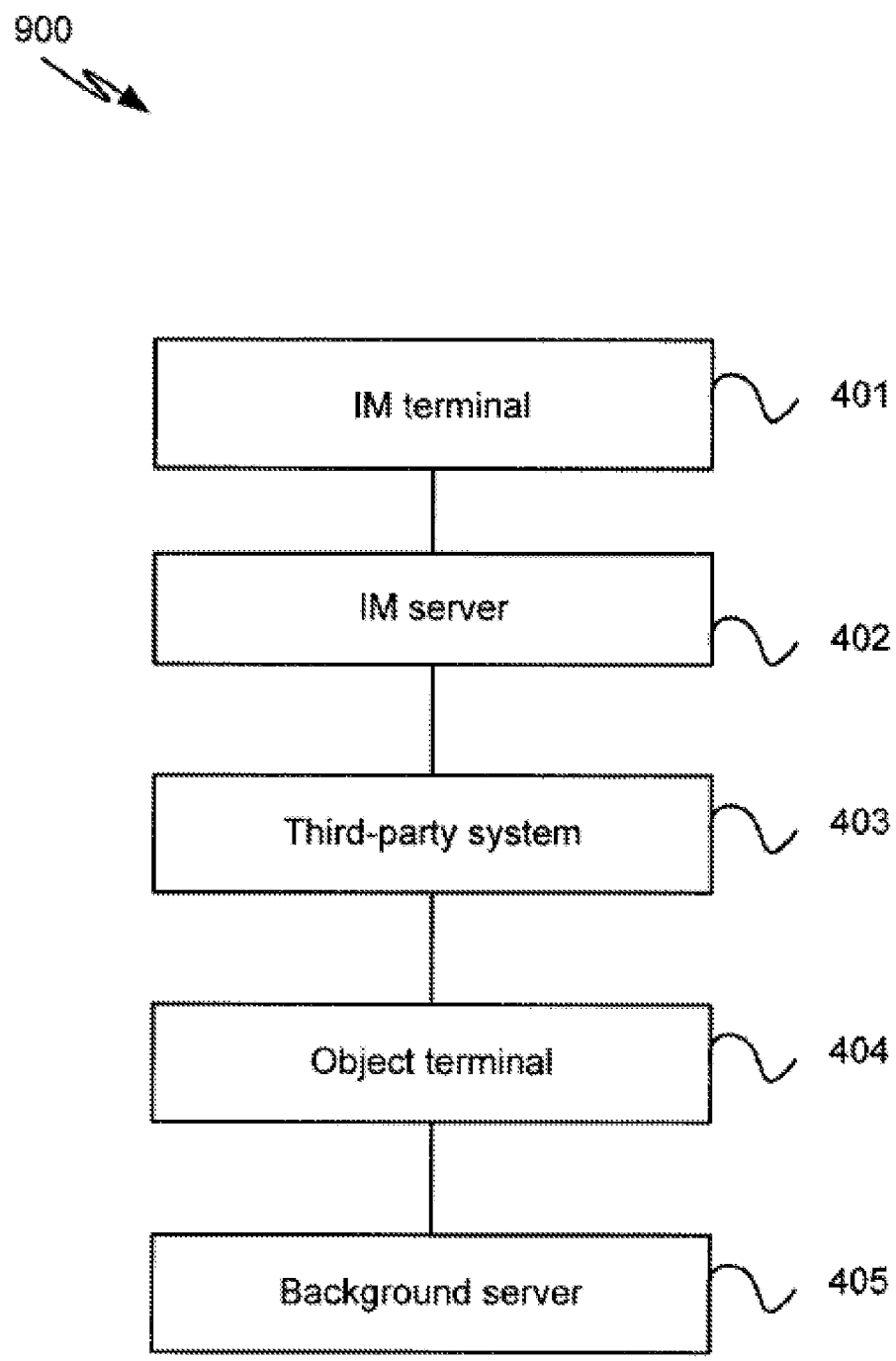
FIG. 10 is a simplified diagram showing a system for processing objects according to another embodiment of the present invention.

FIG. 10 is a simplified diagram showing the system 900 for processing objects according to another embodiment of the present invention. This diagram is merely an example, which should not unduly limit the scope of the claims. One of ordinary skill in the art would recognize many variations, alternatives, and modifications. The system 900 further includes a background server 405.

According to one embodiment, the background server 405 is configured to encrypt the ID of the order data (e.g., for a first time) using a first encryption key, encrypt the ID of the order data, which has undergone the first encryption, (e.g., for a second time) using a second encryption key, and send the ID of the order data which has undergone the second encryption to the object terminal 404. For example, the IM terminal 401 is further configured to decrypt the ID of the order data using the second decryption key corresponding to the second encryption key, and upon successful decryption, perform the operation of acquiring the first account and the user password related to the first subject. In another example, the third-party system 403 is further configured to decrypt the ID of the order data using the first decryption key corresponding to the first encryption key. As an example, upon successful decryption, the third-party system 403 is further configured to deduct the total value from the first value included in the first account related to the first subject and add the total value to the second value included in the first account related to the second subject according to the first account related to the first subject and the user password related to the first subject as well as the ID of the order data.

According to another embodiment, the IM terminal 401 is further configured to send the second account, the first account related to the first subject and the user password related to the first subject to the third-party system 403. For example, the third-party system 403 is further configured to establish a first mapping between the second account related to the first subject and the first account related to the first subject and a second mapping between the first account related to the first subject and the user password related to the first subject. In another example, the third-party system 403 is further configured to send processing results to the IM server 402, and the IM server 402 is further configured to return the processing results to the IM terminal 401. In yet another example, the IM terminal 401 is further configured to notify the object terminal 404 of the processing results, and the object terminal 404 is further configured to display the processing results.

According to one embodiment, a method is provided for processing objects. For example, a call request message is received, the call request message carrying an identification (ID) of order data associated with one or more objects, the order data including at least a total value of the objects and an ID of a second subject; a first account related to a first subject and a user password related to the first subject are acquired; the first account related to the first subject, the user password related to the first subject and the ID of the order data are sent; the first account related to the first subject, the user password related to the first subject and the ID of the order data are forwarded; and based on at least information associated with the first account related to the first subject, the user password related to the first subject and the ID of the order data, the total value is deducted from a first value included in the first account related to the first subject; and the total value is added to a second value included in a first account related to the second subject. For example, the method is implemented according to at least FIG. 1, FIG. 2(a), FIG. 2(b), and/or FIG. 8.

According to another embodiment, a system for processing objects includes an instant messenger (IM) terminal, an IM server, and a third-party system. The IM terminal is configured to receive a call request message from an object terminal, the call request message carrying an identification (ID) of order data associated with one or more objects, the order data including at least a total value of the objects and an ID of a second subject. The IM terminal is further configured to acquire a first account related to a first subject and a user password related to the first subject. The IM server is configured to receive the first account related to the first subject, the user password related to the first subject and the ID of the order data, the IM terminal being logged onto the IM server. The third-party system is configured to receive the first account related to the first subject, the user password related to the first subject and the ID of the order data via a communication interface between the IM server and the third-party system. The third-party system is further configured to deduct the total value from a first value included in the first account related to the first subject and add the total value to a second value included in a first account related to the second subject based on at least information associated with the first account related to the first subject, the user password related to the first subject and the ID of the order data. For example, the system is implemented according to at least FIG. 9, and/or FIG. 10.

According to yet another embodiment, a system for processing objects includes one or more data processors and a computer-readable storage medium. The computer-readable storage medium is encoded with instructions for commanding the data processors to execute the following operations: receiving a call request message, the call request message carrying an identification (ID) of order data associated with one or more objects, the order data including at least a total value of the objects and an ID of a second subject, acquiring a first account related to a first subject and a user password related to the first subject, sending the first account related to the first subject, the user password related to the first subject and the ID of the order data, forwarding the first account related to the first subject, the user password related to the first subject and the ID of the order data, and based on at least information associated with the first account related to the first subject, the user password related to the first subject and the ID of the order data, deducting the total value from a first value included in the first account related to the first subject and adding the total value to a second value included in a first account related to the second subject. For example, the system is implemented according to at least FIG. 1, FIG. 2(*a*), FIG. 2(*b*), and/or FIG. 8.

According to yet another embodiment, a non-transitory computer readable storage medium comprises programming instructions for processing objects. The programming instructions are configured to cause one or more data processors to execute the following operations including: receiving a call request message, the call request message carrying an identification (ID) of order data associated with one or more objects, the order data including at least a total value of the objects and an ID of a second subject, acquiring a first account related to a first subject and a user password related to the first subject, sending the first account related to the first subject, the user password related to the first subject and the ID of the order data, forwarding the first account related to the first subject, the user password related to the first subject and the ID of the order data, and based on at least information associated with the first account related to the first subject, the user password related to the first subject and the ID of the order data, deducting the total value from a first value included in the first account related to the first subject and adding the total value to a second value included in a first account related to the second subject. For example, the storage medium is implemented according to at least FIG. 1, FIG. 2(*a*), FIG. 2(*b*), and/or FIG. 8.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for facilitating payment of one or more objects purchased at an object application in a device of a first subject and sold by a second subject, implemented by a target server, the method comprising:
   receiving an inquiry message sent by an IM application and forwarded by an IM server connected to the IM application, the inquiry message carrying an IM account of the first subject logged in the IM application and an identification (ID) of order data associated with the one or more objects, the order data including at least a total value of the one or more objects and an ID of the second subject;
   determining a first account related to the first subject according to the IM account and a stored target mapping relationship between the IM account and the first account, the first account being a registered account of the first subject at the target server;
   determining the order data according to the ID of the order data;
   sending the first account and the order data to the IM server, the first account and the order data being forwarded by the IM server to the IM application;
   receiving the first account and the user password related to the first subject and the ID of the order data sent by the IM application and forward by IM server;
   generating a first validation code corresponding to the first subject;
   establishing a mapping relationship between the first validation code and the IM account;
   determining identification-validation contact information of the first subject according to the first account related to the first subject;
   sending the first validation code to the device of the first subject according to the identification-validation contact information;
   receiving a second validation code acquired by the IM application and the IM first account sent by the IM application and forwarded by the IM server;
   upon successful validation of the second validation code against the first validation code and successful validation of the received user password on the first account, transferring the total value of the one or more objects from the first account to an account of the second subject to generate an order processing result; and
   sending the order processing result to the IM server to be forwarded to the IM application.

2. The method according to claim 1, further comprising: storing the target mapping relationship between the IM account and the first account prior to receiving the inquiry message, including:
   receiving the IM account and the first account sent by the IM application and forwarded by the IM server;
   establishing the target mapping relationship between the IM account and the first account generating and sending a third validation code to the device of the first subject according to the identification-validation contact information;
   receiving a fourth validation code and the first account sent by the IM application and forwarded by the IM server; and
   upon successful validation of the third validation code against the fourth validation code, storing the target mapping relationship between the IM account and the first account.

3. The method according to claim 2, wherein establishing the target mapping relationship between the IM account and the first account comprises:
   receiving user-provided identification-validation information sent by the IM application and forwarded by the IM server;
   acquiring stored identification-validation information corresponding to the first account from mapping relationships between accounts and a plurality of identification-validation information stored on the target server; and
   upon determining that the user-provided identification-validation information matches with the stored identification-validation information corresponding to the first account, establishing the target mapping relationship between the IM account and the first account.

4. The method according to claim 1, further comprising: prior to receiving the inquiry message,
   receiving, from a background server related to the second object, the ID of the second object and object data of the one or more objects, the object data including at least the total value of the one or more objects;
   packaging the ID of the second object and the object data of the one or more objects into the order data;
   designating a unique ID for the packaged order data; and
   sending the ID of the order data to the background server.

5. The method according to claim 4, wherein:
   the object data further includes at least one of: names of the one or more objects, a mailing address of the first subject, or a name of the second subject.

6. The method according to claim 1, wherein: the ID of the order data received by the target server is encrypted under an encryption key by a background server related to the second subject as encrypted order data; and the method further comprises:
  decrypting, using a prestored decryption key corresponding to the encryption key, the encrypted order data to obtain the ID of the order data.

7. The method according to claim 1, further comprising:
  after generating the order processing result, sending a notification message to a background server related to the second object, the notification message carrying the ID of the order data.

8. A server for facilitating payment of one or more objects purchased at an object application in a device of a first subject and sold by a second subject, comprising:
  a memory; and
  one or more processors coupled to the memory and configured to:
  receive an inquiry message sent by an IM application and forwarded by an IM server connected to the IM application, the inquiry message carrying an IM account of the first subject logged in the IM application and an identification (ID) of order data associated with the one or more objects, the order data including at least a total value of the one or more objects and an ID of the second subject;
  determine a first account related to the first subject according to the IM account and a stored target mapping relationship between the IM account and the first account, the first account being a registered account of the first subject at the target server;
  determine the order data according to the ID of the order data;
  send the first account and the order data to the IM server, the first account and the order data being forwarded by the IM server to the IM application;
  receive the first account and the user password related to the first subject and the ID of the order data sent by the IM application and forward by IM server;
  generate a first validation code corresponding to the first subject;
  establish a mapping relationship between the first validation code and the IM account determine identification-validation contact information of the first subject according to the first account related to the first subject;
  send the first validation code to the device of the first subject according to the identification-validation contact information;
  receive a second validation code acquired by the IM application and the IM account sent by the IM application and forwarded by the IM server;
  upon successful validation of the second validation code against the first validation code and successful validation of the received user password on the first account, transfer the total value of the one or more objects from the first account to an account of the second subject to generate an order processing result; and
  send the order processing result to the IM server to be forwarded to the IM application.

9. The server according to claim 8, wherein the one or more processors are further configured to store the target mapping relationship between the IM account and the first account prior to receiving the inquiry message, including:
  receiving the IM account and the first account sent by the IM application and forwarded by the IM server;
  establishing the target mapping relationship between the IM account and the first account generating and sending a third validation code to the device of the first subject according to the identification-validation contact information;
  receiving a fourth validation code and the first account sent by the IM application and forwarded by the IM server; and
  upon successful validation of the third validation code against the fourth validation code, storing the target mapping relationship between the IM account and the first account.

10. The server according to claim 9, wherein establishing the target mapping relationship between the IM account and the first account comprises:
  receiving user-provided identification-validation information sent by the IM application and forwarded by the IM server;
  acquiring stored identification-validation information corresponding to the first account from mapping relationships between accounts and a plurality of identification-validation information stored on the target server; and
  upon determining that the user-provided identification-validation information matches with the stored identification-validation information corresponding to the first account, establishing the target mapping relationship between the IM account and the first account.

11. The server according to claim 8, wherein the one or more processors are further configured to: prior to receiving the inquiry message,
  receive, from a background server related to the second object, the ID of the second object and object data of the one or more objects, the object data including at least the total value of the one or more objects;
  package the ID of the second object and the object data of the one or more objects into the order data;
  designate a unique ID for the packaged order data; and
  send the ID of the order data to the background server.

12. The server according to claim 11, wherein:
  the object data further includes at least one of: names of the one or more objects, a mailing address of the first subject, or a name of the second subject.

13. The server according to claim 8, wherein: the ID of the order data received by the server is encrypted under an encryption key by a background server related to the second subject as encrypted order data; and the one or more processors are further configured to:
  decrypt, using a prestored decryption key corresponding to the encryption key, the encrypted order data to obtain the ID of the order data.

14. The server according to claim 8, wherein the one or more processors are further configured to:
  after generating the order processing result, sending a notification message to a background server related to the second object, the notification message carrying the ID of the order data.

15. A non-transitory computer readable storage medium storing programming instructions for facilitating payment of one or more objects purchased at an object application in a device of a first subject and sold by a second subject, wherein the programming instructions cause one or more data processors of a server to:
  receive an inquiry message sent by an IM application and forwarded by an IM server connected to the IM application, the inquiry message carrying an IM account of the first subject logged in the IM application and an identification (ID) of order data associated with the one or more objects, the order data including at least a total value of the one or more objects and an ID of the second subject;

determine a first account related to the first subject according to the IM account and a stored target mapping relationship between the IM account and the first account, the first account being a registered account of the first subject at the target server;

determine the order data according to the ID of the order data;

send the first account and the order data to the IM server, the first account and the order data being forwarded by the IM server to the IM application;

receive the first account and the user password related to the first subject and the ID of the order data sent by the IM application and forward by IM server;

generate a first validation code corresponding to the first subject;

establish a mapping relationship between the first validation code and the IM account;

determine identification-validation contact information of the first subject according to the first account related to the first subject;

send the first validation code to the device of the first subject according to the identification-validation contact information;

receive a second validation code acquired by the IM application and the IM account sent by the IM application and forwarded by the IM server;

upon successful validation of the second validation code against the first validation code and successful validation of the received user password on the first account, transfer the total value of the one or more objects from the first account to an account of the second subject to generate an order processing result; and send the order processing result to the IM server to be forwarded to the IM application.

16. The storage medium according to claim 15, wherein the programming instructions cause the one or more data processors to store the target mapping relationship between the IM account and the first account prior to receiving the inquiry message, including:

receiving the IM account and the first account sent by the IM application and forwarded by the IM server;

establishing the target mapping relationship between the IM account and the first account generating and sending a third validation code to the device of the first subject according to the identification-validation contact information;

receiving a fourth validation code and the first account sent by the IM application and forwarded by the IM server; and upon successful validation of the third validation code against the fourth validation code, storing the target mapping relationship between the IM account and the first account.

17. The storage medium according to claim 16, wherein establishing the target mapping relationship between the IM account and the first account comprises:

receiving user-provided identification-validation information sent by the IM application and forwarded by the IM server;

acquiring stored identification-validation information corresponding to the first account from mapping relationships between accounts and a plurality of identification-validation information stored on the target server; and upon determining that the user-provided identification-validation information matches with the stored identification-validation information corresponding to the first account, establishing the target mapping relationship between the IM account and the first account.

18. The storage medium according to claim 15, wherein the programming instructions further cause the one or more data processors to: prior to receiving the inquiry message, receive, from a background server related to the second object, the ID of the second object and object data of the one or more objects, the object data including at least the total value of the one or more objects;

package the ID of the second object and the object data of the one or more objects into the order data;

designate a unique ID for the packaged order data; and send the ID of the order data to the background server.

19. The storage medium according to claim 18, wherein: the object data further includes at least one of: names of the one or more objects, a mailing address of the first subject, or a name of the second subject.

20. The storage medium according to claim 15, wherein: the ID of the order data received by the server is encrypted under an encryption key by a background server related to the second subject as encrypted order data; and the programming instructions further cause the one or more data processors to:

decrypt, using a prestored decryption key corresponding to the encryption key, the encrypted order data to obtain the ID of the order data.

* * * * *